United States Patent Office 3,004,994
Patented Oct. 17, 1961

---

3,004,994
6α,16α-DIMETHYL-PREGNENES
Glen E. Arth, Cranford, Roger E. Beyler, Westfield, and Lewis H. Sarett, Princeton, N.J., assignors to Merck & Co., Inc., Rahway, N.J., a corporation of New Jersey
No Drawing. Filed Sept. 16, 1957, Ser. No. 683,923
26 Claims. (Cl. 260—397.45)

This invention is concerned generally with novel steroid compounds and with processes of preparing the same. More particularly, it relates to novel 6,16-dimethyl-11-oxygenated-1,4-pregnadiene-17α,21-diol-3,20-dione compounds, and to the process of preparing these compounds starting with 16-methyl-4-pregnene-17α,21-diol-3,11,20-trione. These novel 6,16-dimethyl-11-oxygenated-1,4-pregnadiene-17α,21-diol-3,20-dione compounds possess extremely high anti-inflammatory activity, and are especially effective for the treatment of arthritis and related diseases since they can be administered for their cortisone-like action in extremely low dosage thereby minimizing undesired side effects.

These novel 6,16-dimethyl-11-oxygenated-1,4-pregnadiene-17α,21-diol-3,20-dione compounds, subject of the present invention, may be chemically represented as follows:

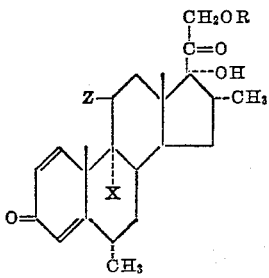

wherein X is hydrogen or halogen, R stands for hydrogen or acyl, and Z is a keto or hydroxy substituent.

These 6,16-dimethyl-11-oxygenated-1,4-pregnadiene-17α,21-diol-3,20-dione compounds are prepared by reacting 16-methyl-4-pregnene-17α,21-diol-3,11,20-trione with formaldehyde under acidic conditions to form 17α,20,20,21-bismethylenedioxy-16α-methyl-4-pregnene-3,11-dione which is reacted with ethylene glycol in the presence of an acidic catalyst to produce 3-ethylenedioxy-17α,20,20,21-bismethylenedioxy-16α-methyl-5-pregnene-11-one. The latter compound is reacted with perbenzoic acid, perphthalic acid and the like, thereby forming 3-ethylenedioxy-17α,20,20,21-bismethylenedioxy-5,6-epoxy-16α-methyl-pregnane-11-one which is then reacted with formic acid to produce a mixture of 17α,20,20,21-bismethylenedioxy-16α-methyl-6-formyloxy-pregnane-5-ol-3,11-dione and 17α,20,20,21-bismethylenedioxy-16α-methyl-5-formyloxy-pregnane-6-ol-3,11-dione, which mixture, upon reaction with an aqueous alkali hydroxide solution, is converted to 17α,20,20,21-bismethylenedioxy-16α-methyl-allopregnane-3,6,11-trione. The last-named compound is reacted with butanone dioxolane to produce 3-ethylenedioxy-17α,20,20,21-bismethylenedioxy-16α-methyl-allopregnane-6,11-dione which is reacted with a methyl Grignard reagent to form 3-ethylenedioxy-17α,20,20,21-bismethylenedioxy-6α,16α-dimethyl-allopregnane-6β-ol-11-one. This 3-ethylenedioxy-17α,20,20,21-bismethylenedioxy-6α,16α-dimethyl-allopregnane-6β-ol-11-one is reacted with a dehydrating agent such as thionyl chloride in pyridine to form the corresponding 3-ethylenedioxy-17α,20,20,21-bismethylenedioxy-6,16α-dimethyl-5-pregnene-11-one, which, upon reaction with p-toluene sulfonic acid monohydrate in acetone is converted to 17α,20,20,21-bismethylenedioxy-6α,16α-dimethyl-4-pregnene-3,11-dione; the latter compound is reacted with an aqueous organic acid hydrolyzing agent to form 6α,16α-dimethyl-4-pregnene-17α,21-diol-3,11,20-trione which can be reacted with an acylating agent to form the corresponding 21-acylate. Alternatively, the 3-ethylenedioxy-17α,20,20,21-bismethylenedioxy-6,16α-dimethyl-5-pregnene-11-one, above-mentioned, can be reacted with lithium aluminum hydride thereby reducing the 11-keto substituent to an 11β-hydroxy radical to produce 3-ethylenedioxy-17α,20,20,21-bismethylenedioxy-6,16α-dimethyl-5-pregnene-11β-ol which is converted, by reaction with p-toluenesulfonic acid monohydrate in acetone, to 17α,20,20,21-bismethylenedioxy-6α,16α-dimethyl-4-pregnene-11β-ol-3-one; the latter compound is reacted with an aqueous organic acid hydrolyzing agent thereby forming 6α,16α-dimethyl-4-pregnene-11β,17α-21-triol-3,20-dione which can be reacted with an acylating agent thereby forming the corresponding 21-acylate derivative.

This 6α,16α-dimethyl-4-pregnene-11β,17α,21-triol-3,20-dione 21-acylate is reacted with a dehydrating agent such as methane sulfonyl chloride in pyridine, or phosphorus oxychloride dissolved in pyridine, to produce the corresponding 6α,16α-dimethyl-4,9(11)-pregnadiene-17α,21-diol-3,20-dione 21-acylate; the latter compound is reacted with hypobromous acid (e.g. N-bromosuccinimide and perchloric acid) to produce 9α-bromo-6α,16α-dimethyl-4-pregnene-11β,17α,21-triol-3,20-dione 21-acylate which is reacted with anhydrous potassium acetate in ethanol to produce 6α,16α-dimethyl-9,11-epoxy-4-pregnene-17α,21-diol-3,20-dione 21-acylate. This 9,11-epoxide is then reacted with hydrogen fluoride in tetrahydrofuran to produce 6α,16α-dimethyl-9α-fluoro-4-pregnene-11β,17α,21-triol-3,20-dione 21-acylate; this compound is reacted with a hydrolyzing agent to form 6α,16α-dimethyl-9α-fluoro-4-pregnene-11β,17α,21-triol-3,20-dione, which can be reacted with an acylating agent to produce 6α,16α-dimethyl-9α-fluoro-4-pregnene-11β,17α,21-triol-3,20-dione 21-acylate.

This 6α,16α-dimethyl-9α-fluoro-4-pregnene-11β,17α,21-triol-3,20-dione 21-acylate is reacted with chromium trioxide in pyridine to form 6α,16α-dimethyl-9α-fluoro-4-pregnene-17α,21-diol-3,11,20-trione 21-acylate which, upon reaction with a hydrolyzing agent, forms 6α,16α-dimethyl-9α-fluoro-4-pregnene-17α,21-triol-3,11-20-trione.

The 6α,16α-dimethyl-11-oxygenated-4-pregnene-17α,21-diol-3,20-dione compounds prepared hereinabove e.g. the 6α,16α-dimethyl-4-pregnene-17α,21-diol-3,11,20-trione compounds and the 6α,16α-dimethyl-4-pregnene-11β,17α,21-triol-3,20-dione compounds, are contacted with the dehydrogenating activity of Schizomycetes microorganisms, or with selenium dioxide, thereby forming the corresponding 6α,16α-dimethyl-11-oxygenated-1,4-pregnadiene-17α,21-diol-3,20-dione compound.

The 16-methyl-4-pregnene-17α,21-diol-3,11,20-trione compound used as starting material in the above-mentioned procedure is conveniently prepared starting with the known 16-pregnene-3α-ol-11,20-dione 3-acetate in accordance with the following procedure: 16-pregnene-3α-ol-11,20-dione 3-acetate is reacted with methyl magnesium iodide in the presence of cuprous chloride thereby forming 16α-methyl-pregnane-3α-ol-11,20-dione 3-acetate, which is reacted with aqueous methanolic hydrochloric acid to form 16α-methyl-pregnane-3α-ol-11,20-dione. The latter compound, which is a potent anaesthetic, is reacted with acetic anhydride in the presence of p-toluene sulfonic acid catalyst to form a mixture of enol acetates containing 16α-methyl-17,20-pregnene-3α, 20-diol-11-one 3,20-diacetate; this mixture, after chromatographic purification to remove any unchanged starting material, is reacted with perbenzoic acid and the resulting 16α-methyl-17α-20-epoxy-pregnane-3α,20-diol- 11-one 3,20 diacetate is hydrolyzed with methanolic potassium bicarbonate to produce 16α-methyl-pregnane-3α,17α-diol-11,20-dione. The latter compound is reacted with bromine in chloroform to form 21-bromo-16α-methyl-pregnane-3α,17α-diol-11,20-dione which is reacted with sodium iodide in acetone to produce 21-iodo-16α-methyl-pregnane-3α,17α-diol-11,20-dione which is converted without isolation to 16α-methyl-pregnane-3α,17α,21-triol-11,20-dione 21-acetate by reaction with anhydrous potassium acetate; this compound is reacted with chromium trioxide in pyridine to form 16α-methyl-pregnane-17α,21-diol-3,11,20-trione 21-acetate. The 16α-methyl-pregnane-17α,21-diol-3,11,20-trione 21-acetate is reacted with bromine in glacial acetic acid-chloroform to produce 4-bromo-16α-methyl-pregnane-17α,21-diol-3,11,20-trione, which is then reacted with semicarbazide to form 16α-methyl-4-pregnene-17α,21-diol-3,11,20-trione 3,20-bis-semicarbazone 21-acetate. The 16α-methyl-4-pregnene-17α,21-diol-3,11,20-trione-3,20-bis-semicarbazone 21-acetate is reacted with potassium bicarbonate or potassium hydroxide in aqueous methanol to form 16α-methyl-4-pregnene-17α,21-diol-3,11,20-trione 3,20-bis-semicarbazone which is then hydrolyzed under acid conditions to produce 16α-methyl-4-pregnene-17α,21-diol-3,11,20-trione.

The reaction between the 16-methyl-4-pregnene-17α,21-diol-3,11,20-trione compound and formaldehyde to form the corresponding bismethylenedioxy derivative is conveniently conducted by intimately mixing together a solution of the steroid in an organic solvent, preferably a halogenated hydrocarbon solvent such as chloroform, and a solution of formaldehyde in an aqueous mineral acid such as aqueous hydrochloric acid. The reaction is ordinarily carried out at substantially room temperature under which conditions the formation of the bismethylenedioxy derivative is substantially complete in about 2–3 days. The non-aqueous layer is recovered, washed with an aqueous alkaline solution until neutral, dried and evaporated to give the 17α,20,20,21-bismethylenedioxy-16α-methyl-4-pregnene-3,11-dione.

The reaction between this bismethylenedioxy derivative and ethylene glycol is carried out by heating the reactants together in solution in a hydrocarbon solvent such as benzene in the presence of an acidic catalyst such as p-toluenesulfonic acid. Using benzene as the solvent, the reaction is conveniently conducted by heating the reaction solution under reflux for a period of about 15 hours, following which the cooled reaction solution is washed with an aqueous alkaline solution, dried and evaporated to give 3-ethylenedioxy-17α,20,20,21-bismethylenedioxy-16α-methyl-5-pregnene-11-one. This 3-ethylenedioxy derivative can be purified if desired by chromatography on acid washed alumina.

The 3-ethylenedioxy-17α,20,20,21-bismethylenedioxy-16α-methyl-5-pregnene-11-one is reacted with perbenzoic acid or perphthalic acid in the presence of a liquid medium, for example a hydrocarbon solvent such as benzene. The reaction is conveniently conducted at room temperature under which conditions the reaction is ordinarily substantially complete in about 2 days. The reaction solution is decanted from a portion of the epoxide product, and the remaining epoxide is recovered from the neutralized and dried reaction solution by evaporation. The epoxide product, that is the 3-ethylenedioxy-17α,20,20,21-bismethylenedioxy-5,6-epoxy-16α-methyl-pregnane-11-one, is dissolved in substantially anhydrous formic acid, and the resulting solution allowed to stand at room temperature for a period of about 2–3 hours. The reaction solution is then poured into water and the aqueous mixture is extracted with a halogenated hydrocarbon solvent such as chloroform. The chloroform extract is neutralized, dried and evaporated to give a mixture of 17α,20,20,21-bismethylenedioxy-16α-methyl-6-formyloxy-pregnane-5-ol-3,11-dione and 17α,20,20,21-bismethylenedioxy-16α-methyl-5-formyloxy-pregnane-6-ol-3,11-dione.

The reaction between the mixed formyloxy derivatives and the alkali hydroxide solution is conveniently conducted by dissolving the formyloxy compounds in a lower alkanol, adding to this solution an aqueous solution of alkali metal hydroxide such as potassium hydroxide, and heating the resulting aqueous alcoholic alkaline solution under reflux and in the presence of a nitrogen atmosphere for a period of approximately ½ hour. The reaction solution is cooled, neutralized with an organic acid such as acetic acid, and evaporated to small volume. The aqueous concentrate is diluted with water, and the aqueous mixture is extracted with a halogenated hydrocarbon solvent such as chloroform. The non-aqueous extract is neutralized, dried and evaporated to give 17α,20,20,21-bismethylenedioxy-16α-methyl-allopregnane-3,6,11-trione, which can be purified, if desired, by crystallization from a lower alkanol such as methanol.

The reaction between the 17α,20,20,21-bismethylenedioxy-16α-methyl-allopregnane-3,6,11-trione and butanone dioxolane is conveniently conducted by heating the reactants together under reflux in the presence of an acidic catalyst such as p-toluenesulfonic acid under which conditions the reaction is ordinarily complete in about 10 minutes. The reaction mixture is cooled, diluted with chloroform and the resulting chloroform solution is washed with bicarbonate, dried and evaporated to give 3-ethylenedioxy-17α,20,20,21-bismethylenedioxy-16α-methyl-allopregnane-6,11-dione, which can be purified, if desired, by crystallization from ethyl acetate.

A solution of this 3-ethylenedioxy-17α,20,20,21-bismethylenedioxy-16α-methyl-allopregnane-6,11-dione in benzene is then added with stirring, over a 10 minute period, to a solution of methyl magnesium iodide in diethyl ether. The resulting mixture is allowed to stir for about ½ hour additional time, water is added followed by additional benzene, and the organic layer is recovered, dried and evaporated to give the corresponding 3-ethylenedioxy-17α,20,20,21-bismethylenedioxy-6α,16α-dimethylallopregnane-6β-ol-11-one.

The reaction between the 3-ethylenedioxy-17α,20,20,21-bismethylenedioxy-6α,16α-dimethylallopregnane-6β-ol-11-one and thionyl chloride, when the latter is used as the dehydrating agent, is conveniently conducted by adding a solution of thionyl chloride in anhydrous pyridine drop-wise to an anhydrous pyridine solution of the steroid, while maintaining the temperature of the solution at approximately 40° C. The resulting solution is stirred for an additional ½ hour period, cooled, poured into ice water, and the aqueous mixture extracted with a halogenated hydrocarbon solvent such as chloroform. The chloroform layer is neutralized, dried, and evaporated to a crude produce which is purified by chromatography over alumina to give 3-ethylenedioxy-17α,20,20,21-bismethylenedioxy-6,16α-dimethyl-5-pregnene-11-one.

The 3-ethylenedioxy-17α,20,20,21-bismethylenedioxy-6,16α-dimethyl-5-pregnene-11-one is dissolved in anhydrous acetone containing p-toluenesulfonic acid monohydrate, and the resulting solution is allowed to stand at room temperature for a period of about 15 hours. The resulting solution is then poured into water, the aqueous mixture is extracted with a halogenated hydrocarbon solvent such as chloroform. The chloroform solution is neutralized, dried and evaporated to give 17α,20,20,21-bismethylenedioxy-6α,16α-dimethyl-4-pregnene-3,11-dione.

The reaction between the 17α,20,20,21-bismethylenedioxy-6α,16α-dimethyl-4-pregnene-3,11-dione and the aqueous organic acid hydrolyzing agent, more particularly an aqueous acetic acid solution, is carried out by heating the reactants together at about 70° C. in a nitrogen atmosphere for a period of about 8 hours. The hydrolysis solution is evaporated to give 6α,16α-dimethyl-4-pregnene-17α,21-diol-3,11,20-trione, which is then reacted with an acylating agent e.g. acetic anhydride and pyridine to form the corresponding 6α,16α-dimethyl-4-pregnene-17α,21-diol-3,11,20-trione 21-acylate.

The reaction between the hereinabove mentioned 3-ethylenedioxy - 17α,20,20,21 - bismethylenedioxy - 6,16α-dimethyl-5-pregnene-11-one compound and lithium aluminum hydride is carried out by adding a solution of the steroid in a hydrocarbon solvent such as benzene to an ethereal suspension of the lithium aluminum hydride and heating the resulting suspension under reflux for a period of about 4 hours. Ethyl acetate is added to the cooled reaction mixture to destroy excess lithium aluminum hydride, water is then added, and the ethereal layer is recovered, dried and evaporated to give a crude crystalline material which is purified by chromatography over acid washed alumina to give 3-ethylenedioxy-17α,20,20,21-bismethylenedioxy-6,16α-dimethyl-5-pregnene-11β-ol.

The reaction of the 3-ethylenedioxy-17α,20,20,21-bismethylenedioxy-6,16α-dimethyl-5-pregnene-11β-ol and p-toluenesulfonic monohydrate in acetone is conducted in the same manner as described hereinabove in connection with the corresponding 3-ethylenedioxy-17α,20,20,21-bismethylenedioxy-6,16α-dimethyl-5-pregnene-11-one to produce 17α,20,20,21-bismethylenedioxy-6α,16α-dimethyl-4-pregnene-11β-ol-3-one, which is then reacted with an aqueous organic acid hydrolyzing agent such as aqueous acetic acid in the same manner as that set forth hereinabove in connection with the hydrolysis of the 17α,20,20,21-bismethylenedioxy-6α,16α-dimethyl - 4 - pregnene-3,11-dione compound, thereby forming 6α,16α-dimethyl-4-pregnene-11β,17α,21-triol-3,20-dione, which is reacted with an acylating agent, e.g. acetic anhydride in pyridine to form the corresponding 21-acylate such as 6α,16α-dimethyl-4-pregnene-11β,17α,21-triol-3,20-dione 21-acetate, and the like.

The reaction between the 6α,16α-dimethyl-4-pregnene-11β,17α,21-triol-3,20-dione 21-acylate and phosphorous oxychloride or methane sulfonyl chloride is conducted by bringing the reactants together in pyridine solution at room temperature and allowing the solution to stand at that temperature for a period of about 15 hours. The pyridine reaction solution is evaporated in vacuo to small volume, diluted with water and extracted with a water-immiscible organic solvent such as ethyl acetate. Evaporation of the washed and dried ethyl acetate solution gives the corresponding 6α,16α-dimethyl-4,9(11)-pregnadiene-17α,21-diol-3,20-dione 21-acylate which can be purified if desired by crystallization from an organic solvent such as ethyl acetate-ether.

The addition of hypobromous acid to the Δ9(11)-double bond of this 6α,16α-dimethyl-4,9(11)-pregnadiene-17α,21-diol-3,20-dione 21-acylate is conveniently carried out by adding an aqueous solution of perchloric acid to a suspension of the steroid compound and N-bromosuccinimide in aqueous dioxane while maintaining the temperature of the mixture below about 15° C. The reaction mixture is allowed to stand at 15° C. for about 2-3 hours, the yellow solution is treated with allyl alcohol to discharge excess N-bromosuccinimide, and the resulting solution is evaporated in vacuo to small volume. The concentrated solution is diluted with water and the aqueous mixture extracted with a water-immiscible organic solvent such as ethyl acetate. The washed and dried ethyl acetate extract is evaporated to dryness to give the corresponding 9α-bromo-6α,16α-dimethyl - 4 - pregnene-11β,17α,21-triol-3,20-dione 21-acylate which can be purified, if desired by crystallization from an organic solvent such as ethyl acetate-ether.

The reaction of this 9,11-bromohydrin with potassium acetate is carried out by heating the reactants together in ethanol under reflux for a period of about two hours. The cooled reaction mixture is evaporated to small volume in vacuo, the concentrated solution is diluted with water, and the aqueous mixture is extracted with ethyl acetate. The washed and dried ethyl acetate extract is evaporated in dryness in vacuo to give the corresponding 6α,16α-dimethyl-9,11-epoxy-4-pregnene-17α,21-diol-3,20-dione 21-acylate which is purified by crystallization from ethyl acetate-ether.

The reaction between this 9,11-epoxide and hydrogen fluoride is conveniently conducted by bringing the reactants together in cold alcohol-free chloroform and allowing the resulting mixture to stand at 0° C. for about two hours. A cold aqueous solution of sodium acetate is added, and the resulting mixture is agitated vigorously. The layers are separated, and the chloroform layer is washed, dried and evaporated to dryness in vacuo to give 6α,16α-dimethyl-9α-fluoro - 4 - pregnene-11β,17α,21-triol-3,20-dione 21-acylate which can be purified by crystallization from acetone-petroleum ether.

This 6α,16α-dimethyl-9α-fluoro-4-pregnene-11β,17α,21-triol-3,20-dione 21-acylate is then dissolved in a mixture of benzene and dilute methanolic potassium hydroxide and the mixture allowed to stand at room temperature for about 10 minutes. The reaction mixture is acidified with acetic acid, the solvents are evaporated in vacuo and the residual material is crystallized from ethyl acetate-ether to give 6α,16α-dimethyl-9α fluoro-4-pregnene-11β,17α,21-triol-3,20-dione.

The oxidation of the 11β-hydroxyl group in the 6α,16α-dimethyl-9α-fluoro - 4 - pregnene-11β,17α,21-triol-3,20-dione 21-acylate is conducted by dissolving the steroid ester in pyridine and adding the solution to the complex formed by adding 1 part of chromium trioxide to 5 parts of pyridine. The reactants are mixed thoroughly and the mixture allowed to stand at room temperature about 15 hours. The reaction mixture is poured into water and the aqueous mixture is extracted with ether and then with ethyl acetate. The combined organic extracts are washed, dried and evaporated to dryness in vacuo to give 6α,16α-dimethyl-9α-fluoro-4-pregnene-17α,21-diol-3,11,20-trione 21-acylate which can be purified by crystallization from ethyl acetate-ether. This 21-ester is hydrolyzed with methanolic potassium hydroxide-benzene, in the same manner as described hereinabove in connection with the hydrolysis of 6α,16α-dimethyl-9α-fluoro-4-pregnene-11β,17α,21-triol-3,20-dione 21-acylate, to produce 6α,16α-dimethyl-9α-fluoro-4-pregnene-17α,21-diol-3,11,20-trione.

The microbiological Δ¹ dehydrogenation of these 6α,16α - dimethyl - 11 - oxygenated - 4 - pregnene - 17α,21-diol-3,20-dione compounds, e.g. 6α,16α-dimethyl-4-pregnene - 17α,21 - diol - 3,11,20 - trione; 6α,16α - dimethyl - 4 - pregnene - 11β,17α,21 - triol - 3,20 - dione; 6α,16α - dimethyl - 9α - fluoro - 4 - pregnene - 17α,21-diol - 3,11,20 - trione; 6α,16α - dimethyl - 9α - fluoro - 4-pregnene - 11β,17α,21 - triol - 3,20 - dione; 21 esters of these 6α,16α - dimethyl - 11 - oxygenated - 4 - pregnene-17α,21-diol-3,20-dione compounds, and the like, is conveniently conducted utilizing Schizomycetes microorganisms. This dehydrogenation reaction is effected by contacting the steroid compound with the Schizomycetes microorganisms themselves or, if preferred, with enzyme systems of Schizomycetes microorganisms whereby the hydrogen attached to the C–1 and C–2 carbon atoms is selectively removed to produce the corresponding Δ¹-steroid substantially uncontaminated by unwanted products. When the 6α,16α-dimethyl-11-oxygenated-4-pregnene-17α,21-diol-3,20-dione compound is thus subjected to the dehydrogenating activity of Schizomycetes microorganisms, the corresponding 6α,16α-dimethyl-11-oxygenated - 1,4 - pregnadiene - 17α,21 - diol - 3,20 - dione compound is obtained directly and in high yield. This microbiological Δ¹ dehydrogenation procedure is ordinarily carried out by adding the 6α,16α-dimethyl-11-oxygenated - 4 - pregnene - 17α,21 - diol - 3,20 - dione compound as a solid, or as a solution in a solvent as for example a dialkyl ketone such as acetone, a dialkylformamide such as dimethyl-formamide, and the like, under sterile conditions to a culture of the microorganism in a nutrient medium and agitating the resulting mixture thereby bringing about growth of the microorganism and dehydrogenation of the steroid compound.

The steroid can be added at the time the nutrient medium is inoculated with the culture of Schizomycetes microorganisms or, alternatively, may be added to an established culture. Instead of adding the steroid compound to the established culture in the nutrient medium, the cell growth from such established culture may be filtered from the broth, washed with distilled water, then suspended in buffered aqueous solution containing the 6α,16α - dimethyl - 11 - oxygenated - 4 - pregnene-17α,21-diol-3,20-dione compound, and the resulting mixutre agitated thereby effecting dehydrogenation of the steroid compound to form the corresponding 6α,16α-dimethyl - 11 - oxygenated - 1,4 - pregnadiene - 17α,21-diol-3,20-dione. The latter is more readily recovered from this medium than from the mixture obtained when the steroid is incubated with the microorganism in the original nutrient medium. Alternatively, the 6α,16α-dimethyl - 11 - oxygenated - 4 - pregnene - 17α,21 - diol-3,20-dione compound may be contacted with dehydrogenating enzyme preparations from the growth of Schizomycetes microorganisms.

The nutrient mediums used in carrying out this bacteriological dehydrogenation are those ordinarily utilized in the propagation of Schizomycetes microorganisms. The usual nutrients include a nitrogen and carbon source, inorganic salts and growth factors when required. The carbon can be provided by compounds such as acetates, lactates, and the like. The nitrogen can be provided by an ammonium salt, amino acids, or proteins such as soy beans, oats, yeast, yeast extracts, tryptic digest of casein, meat extract, blood meal, protein meat and bone scrap, salmon meal, fish meals, fish solubles, distillers solubles, and the like. If desired, the Schizomycetes microorganisms can be propagated using proteins (or amino acids) without any carbohydrate being present in the medium, in which case the proteins or amino acids serve as the source of both the carbon and nitrogen required by the microorganisms.

While, as noted hereinabove, the dehydrogenation of the 6α,16α - dimethyl - 11 - oxygenated - 4 - pregnene-17α,21-diol-3,20-dione compound may be carried out using dehydrogenating enzyme preparations from the growth of Schizomycetes microorganisms, or by contacting the steroid compound with a suspension of an established culture in distilled water, it is ordinarily preferred to add the 6α,16α-dimethyl-11-oxygenated-4-pregnene-17α,21-diol-3,20-dione compound to a nutrient medium containing a 24-hour growth of Schizomycetes microorganisms. The proportion of steroid compound which may be added to the medium varies depending upon the particular substrate being dehydrogenated, but it is ordinarily preferred to employ a concentration of about 0.005% to 0.2% of 6α,16α - dimethyl - 11 - oxygenated - 4 - pregnene - 17α,21 - diol - 3,20 - dione compound, although higher or lower concentrations may be employed, if desired. The culture containing the added steroid compound is then incubated, preferably with agitation and aeration for an additional period which ordinarily varies between about 10 hours and 50 hours, although shorter or longer fermentation times may be advantageous for the dehydrogenation of particular substrates. In view of the fact that prolonged fermentations may result in destruction of a portion of the Δ¹-dehydrogenated steroid product, it is ordinarily preferred to employ a fermentation time of about 10 hours to 24 hours which, depending upon the steroid substrate, has been found to result in maximal yields of the Δ¹-dehydrogenated steroid product.

After completion of the dehydrogenation process, the 6α, 16α - dimethyl - 11 - oxygenated - 1,4 - pregnadiene-17α,21-diol-3,20-dione product is conveniently recovered from the fermented broth by extraction with a water-immiscible solvent as for example a chlorinated hydrocarbon such as chloroform, a ketone such as methyl isobutyl ketone, an alkyl alkanoate such as ethyl acetate, and the like. The extract of Δ¹-dehydrogenated steroid product and any unreacted starting material which may be present is conveniently purified by chromatography using silica gel, activated alumina, and the like or, if desired, by means of paper chromatograms. After separation of the dehydrogenated product from unreacted starting material, the product can be purified further, if desired, by recrystallization from a solvent such as ethyl acetate, ethyl acetate-petroleum ether, and the like.

In accordance with this microbiological dehydrogenation method, and using the 6α,16α-dimethyl-11-oxygenated-4-pregnene-17α,21-diol-3,20 - dione starting materials enumerated hereinbelow, there are obtained 6α, 16α - dimethyl - 11 - oxygenated - 1,4 - pregnadiene - 17α,21-diol-3,20-dione compounds such as 6α,16α-dimethyl-1,4-pregnadiene-17α,21-diol-3,11,20 - trione; 6α,16α-dimethyl - 1,4 - pregnadiene - 11β,17α,21 - triol - 3,20 - dione; 6α,16α-dimethyl-9α-fluoro-17α,21-diol-3,11,20-trione and 6α,16α-dimethyl-9α-fluoro-11β,17α,21-triol-3,20-dione.

Irrespective of whether the 6α,16α-dimethyl-11-oxygenated-4-pregnene-17α,21-diol-3,20-dione starting material employed in this microbiological dehydrogenation reaction is a 21-free alcohol or a 21-ester thereof, the product obtained is the corresponding 6α,16α-dimethyl-11 - oxygenated - 1,4 - pregnadiene - 17α,21 - diol - 3, 20-dione 21-free alcohol, since any 21-ester grouping which may be present is hydrolyzed during the microbiological dehydrogenation reaction. These 6α,16α-dimethyl - 11 - oxygenated - 1,4 - pregnadiene - 17α,21 - diol-3,20-dione 21-free alcohols can be converted to the corresponding 21-esters by reaction with an acylating agent e.g. a phosphorylating agent, a lower hydrocarbon carboxylic acid acylating agent such as benzoic anhydride, tertiary butyl acetyl chloride, a lower alkanoic anhydride or lower alkanoyl halide such as acetic anhydride, propionic anhydride, a polybasic acid anhydride such as β,β-dimethyl-glutaric anhydride, succinic anhydride, and the like.

In accordance with this acylation procedure there are obtained 6α,16α - dimethyl-1,4-pregnadiene-17α,21-diol-3,11,20-trione 21-esters as, for example, 6α,16α-dimethyl - 1,4 - pregnadiene - 17α,21 - diol - 3,11,20 - trione 21-phosphate; 6α,16α-dimethyl-1,4-pregnadiene-17α, 21-diol-3,11,20-trione 21 - lower hydrocarbon carbonyl esters such as 6α,16α-dimethyl-1,4-pregnadiene-17α,21-diol - 3,11,20 - trione 21-benzoate; 6α,16α-dimethyl-1,4-pregnadiene-17α,21-diol-3,11,20-trione 21-tertiary butyl acetate; 6α,16α - dimethyl - 1,4 - pregnadiene-17α,21-diol-3,11,20-trione 21-lower alkanoates such as 6α,16α-dimethyl - 1,4 - pregnadiene - 17α,21 - diol - 3,11,20 - trione 21-acetate; 6α,16α-dimethyl-1,4-pregnadiene-17α,21-diol-3,11,20-trione 21-propionate; 6α,16α-dimethyl-1,4-pregnadiene-11β,17α,21-triol-3,20-dione 21 - esters as, for example, 6α,16α-dimethyl-1,4-pregnadiene-11β,17α,21-triol-3,20-dione 21-phosphate; 6α,16α-dimethyl-1,4-pregnadiene - 11β,17α,21 - triol-3,20-dione 21-lower hydrocarbon carbonyl esters, such as 6α,16α-dimethyl-1,4-pregnadiene-11β,17α,21-triol-3,20-dione 21-benzoate; 6α,16α-dimethyl-1,4-pregnadiene-11β,17α,21-triol-3,20-dione 21-tertiary butyl acetate; 6α,16α-dimethyl-1,4-pregnadiene-11β,17α, 21-triol-3,20-dione 21-lower alkanoates such as 6α,16α-dimethyl - 1,4 - pregnadiene - 11β,17α,21 - triol - 3,20 - dione 21-acetate; 6α,16α-dimethyl-1,4-pregnadiene-11β, 17α,21-triol-3,20-dione 21-propionate; 9α-fluoro-6α,16α-dimethyl - 1,4 - pregnadiene - 17α,21 - diol - 3,11,20 - trione 21-esters as, for example, 9α-fluoro-6α,16α-dimethyl - 1,4 - pregnadiene-17α,21-diol-3,11,20-trione 21-phosphate; 9α-fluoro-6α,16α-dimethyl-1,4-pregnadiene-17α,21-diol-3,11,20-trione 21-lower hydrocarbon carbonyl esters such as 9α-fluoro-6α,16α-dimethyl-1,4-pregnadiene-17α, 21-diol-3,11,20-trione 21-benzoate; 9α-fluoro-6α,16α-dimethyl - 1,4 - pregnadiene - 17α,21 - diol - 3,11,20 - trione 21-tertiary butyl acetate; 9α-fluoro-6α,16α-dimethyl-1,4-pregnadiene-17α,21-diol-3,11,20-trione 21-lower alkanoates such as 9α-fluoro-6α,16α-dimethyl-1,4-pregnadiene-17α,21-diol-3,11,20-trione 21-acetate; 9α-fluoro-6α,16α - dimethyl - 1,4 - pregnadiene - 17α,21 - diol - 3,11,20-trione 21-propionate; 9α-fluoro-6α,16α-dimethyl-1,4-pregnadiene-11β,17α,21-triol-3,20-dione 21 esters as, for example, 9α-fluoro-6α,16α-dimethyl-1,4-pregnadiene-11β,17α,21-triol-3,20-dione 21-phosphate; 9α-fluoro-6α,16α-dimethyl - 1,4 - pregnadiene - 11β,17α,21 - triol - 3,20 - dione 21-lower hydrocarbon carbonyl esters, such as 9α-fluoro - 6α,16α - dimethyl - 1,4 - pregnadiene - 11β,17α,21-triol-3,20-dione 21-benzoate; 9α-fluoro-6α,16α-dimethyl - 1,4 - pregnadiene - 11β,17α,21 - triol - 3,20 - dione 21 - tertiary butyl acetate; 9α-fluoro-6α,16α-dimethyl-1,4-pregnadiene - 11β,17α,21 - triol - 3,20-dione 21-lower alkanoates such as 9α-fluoro-6α,16α-dimethyl-1,4-pregnadiene-11β,17α,21-triol-3,20-dione 21-acetate; 9α-fluoro-6α,16α - dimethyl - 1,4 - pregnadiene - 11β,17α,21 - triol - 3,20-dione 21-propionate and the like.

Alternatively, instead of the above-mentioned microbiological dehydrogenation method, the 6α,16α-dimethyl-11-oxygenated - 4 - pregnene-17α,21-diol-3,20-dione compound is reacted with selenium dioxide thereby effecting ring A dehydrogenation to form the corresponding 6α,16α-dimethyl-11-oxygenated-1,4-pregnadiene-17α,21-diol-3,20-dione compound. This selenium dioxide dehydrogenation procedure is conveniently conducted by bringing the 6α,16α-dimethyl-11-oxygenated-4-pregnene-17α,21-diol- 3,20-dione compound, and selenium dioxide together in the presence of an organic solvent such as for example dioxane, an alcohol solvent such as t-butanol, etc., and heating the mixture at an elevated temperature. When t-butanol is used as the solvent, it is ordinarily preferred to carry out this reaction at the boiling point of the solvent, under which conditions the reaction is ordinarily complete in about fifteen hours. The reaction mixture is ordinarily filtered, thereby removing metallic selenium, and the filtered solution is evaporated to dryness in vacuo to give the desired 6α,16α-dimethyl-11-oxygenated-1,4-pregnadiene-17α,21-diol-3,20-dione compound. The crude material obtained in this way is conveniently purified by paper strip chromatography in accordance with the procedure outlined hereinabove in connection with the purification of the 6α,16α-dimethyl-11-oxygenated-1,4-pregnadiene-17α,21-diol-3,20-dione compound produced by microbiological dehydrogenation.

The following examples illustrate methods of carrying out the present invention but it is to be understood that these examples are given for purposes of illustration and not of limitation.

*Example 1*

10 grams of 16α-methyl-4-pregnene-17α,21-diol-3,11,20-trione are dissolved in 400 cc. of chloroform. To this solution is added a mixture of 100 cc. of concentrated aqueous hydrochloric acid and 100 cc. of 37% aqueous formaldehyde solution. The resulting mixture is stirred for a period of approximately 3 days at room temperature. The chloroform layer is separated, washed with sodium bicarbonate solution until neutral, then with water, dried over anhydrous sodium sulfate, and evaporated to dryness in vacuo. The residual crude material is purified by crystallization from a mixture of methylene chloride and methanol to give 17α,20,20,21-bismethylenedioxy-16α-methyl-4-pregnene-3,11-dione.

10 grams of 17α,20,20,21-bismethylenedioxy-16α-methyl-4-pregnene-3,11-dione are dissolved in 500 cc. of benzene, to the solution is added 25 cc. ethylene glycol and 1 gram of p-toluenesulfonic acid, and the resulting mixture is heated under reflux for a period of approximately 15 hours. The reaction solution is cooled, washed with aqueous sodium bicarbonate solution, dried over anhydrous sodium sulfate, and evaporated to dryness in vacuo. The residual crude material is adsorbed from its solution in benzene on 250 g. of acid-washed alumina, and the resulting adsorbate is eluted utilizing mixtures of ether-petroleum ether to give 3-ethylenedioxy-17α,20,20,21-bismethylenedioxy-16α-methyl-5-pregnene-11-one.

A mixture of 10 grams of 3-ethylenedioxy-17α,20,20,21-bismethylenedioxy-16α-methyl-5-pregnene-11-one, 4.3 g. perbenzoic acid and 230 cc. benzene is allowed to stand at room temperature for a period of about 2 days. A portion of the epoxide product, which precipitates, is separated from the reaction solution by decantation, and the decanted solution is washed with saturated aqueous sodium bicarbonate solution and then dried over anhydrous sodium sulfate. The dried solution is then evaporated in vacuo, and the residual epoxide product is combined with the epoxide product originally separated from the reaction mixture.

The mixed epoxides are dissolved in 200 cc. of substantially anhydrous formic acid and the resulting solution is allowed to stand at room temperature for a period of about 2½ hours. The reaction solution is poured into water, and the aqueous mixture is extracted with chloroform. The chloroform solution is washed with saturated aqueous sodium bicarbonate solution, dried over anhydrous sodium sulfate, and evaporated in vacuo to give a mixture of 17α,20,20,21-bismethylenedioxy-16α-methyl-6-formyloxy-pregnane-5-ol-3,11-dione and 17α,20,20,21-bismethylenedioxy-16α-methyl-5 - formyloxy - pregnane-6-ol-3,11-dione.

This mixture of 5-formyloxy and 6-formyloxy derivatives is dissolved in about 850 cc. of methanol, to this solution is added a solution containing about 17 grams of potassium hydroxide in 80 cc. of water, and the resulting mixture is heated under reflux in a nitrogen atmosphere for a period of approximately ½ hour. The reaction solution is cooled, neutralized with about 23 cc. of acetic acid and evaporated in vacuo to a small volume. The concentrated solution is poured into water and the aqueous mixture is extracted with chloroform. The chloroform extract is washed with aqueous sodium bicarbonate solution, dried over anhydrous sodium sulfate, and evaporated to dryness in vacuo. The residual material is crystallized from methanol to give 17α,20,20,21-bismethylenedioxy-16α-methyl-allopregnane-3,6,11-trione.

A solution containing about 5 grams of 17α,20,20,21-bismethylenedioxy - 16α - methyl-allopregnene-3,6,11-trione and 0.1 g. of p-toluenesulfonic acid in 120 cc. butanone dioxolane is heated under reflux for a period of about 10 minutes. The reaction solution is cooled to about 0–5° C., diluted with chloroform, and the resulting solution is washed with aqueous sodium bicarbonate solution and dried over anhydrous sodium sulfate. The resulting dried solution is evaporated to dryness in vacuo, and the residual material is slurried with ether, recovered by filtration and then dried to give 3-ethylenedioxy-17α,20,20,21 - bismethylenedioxy-16α-methyl-allopregnane-6,11-dione.

A solution containing about 5 grams of 3-ethylenedioxy - 17α,20,20,21-bismethylenedioxy-16α-methyl-allopregnane-6,11-dione in 70 cc. of benzene is added, with stirring over a period of approximately 10 minutes, to an ethereal solution containing the methyl magnesium iodide, prepared from 5 cc. of methyl iodide and 0.5 gram of magnesium turnings, dissolved in 50 cc. of ether. The reaction mixture is allowed to stir for an additional ½ hour period, and the resulting solution is decomposed with 70 cc. of water. About 170 cc. of benzene is added to the aqueous mixture and the layers are separated. The aqueous layer is extracted with two 100 cc.-portions of chloroform, and the organic layers are combined, dried over anhydrous sodium sulfate, and evaporated to dryness in vacuo to give 3-ethylenedioxy-17α,20,20,21-bismethylenedioxy - 6α,16α-dimethyl-allopregnane-6β-ol-11-one.

A solution containing 5.5 cc. of freshly distilled thionyl chloride in 26 cc. of cold anhydrous pyridine is added dropwise, with stirring, to a solution of 5.0 g. of 3-ethylenedioxy - 17α,20,20,21 - bismethylenedioxy-6α,16α-dimethyl-allopregnene-6β-ol-11-one in 32 cc. of anhydrous pyridine, while maintaining the temperature of the reaction mixture at approximately 40° C. The reaction solution is stirred for an additional 30 minute period following the addition of the thionyl chloride reagent, and the reaction mixture is then cooled to about 0–5° C. and poured into 180 cc. ice water. The aqueous mixture is extracted with chloroform, and the chloroform extract is neutralized, dried over anhydrous sodium sulfate, and evaporated to dryness in vacuo. The residual material, dissolved in benzene, is chromatographed on 150 grams of acid-washed alumina; elution of the resulting adsorbate with mixtures of petroleum ether and ether gives 3-ethylenedioxy - 17α,20,20,21-bismethylenedioxy-6,16α-dimethyl-5-pregnene-11-one.

A solution containing about 5 grams of 3-ethylenedioxy - 17α,20,20,21 - bismethylenedioxy-6,16α-dimethyl-5-pregnene-11-one, 500 cc. of anhydrous acetone and about 0.5 g. of p-toluenesulfonic acid monohydrate is allowed to stand for a period of about 15 hours. The reaction solution is poured into water, and the aqueous mixture is extracted with chloroform. The chloroform solution is washed with aqueous sodium bicarbonate solution, dried over anhydrous sodium sulfate, and the chloroform solution is evaporated to dryness in vacuo. The residual material is crystallized from benzene to give 17α,20,20,21-bismethylenedioxy - 6α,16α - dimethyl - 4-pregnene-3,11-dione.

About 0.1 gram of 17α,20,20,21-bismethylenedioxy-6α,16α-dimethyl-4-pregnene-3,11-dione is suspended in 18 cc. of 50% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give 6α,16α - dimethyl-4-pregnene-17α,21-diol-3,11,20-trione. This material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0–5° C. and poured into ice water. The aqueous suspension is extracted with chloroform, and the chloroform extract is washed with aqueous sodium bicarbonate solution, dried over anhydrous sodium sulfate, and evaporated to dryness in vacuo. The residual material, dissolved in 30 cc. benzene, is adsorbed on 5 grams of acid-washed alumina; the adsorbate is washed with 50 cc. ether. The adsorbate is then eluted with 250 cc. of a 5:5 mixture of ether-chloroform, and then with 50 cc. of a 3:7 mixture of ether-chloroform. The eluates are evaporated in vacuo, and the residual material is crystallized from methanol to give 6α,16α-dimethyl-4-pregnene-17α,21-diol-3,11,20-trione 21-acetate.

To a solution of 100 mg. of 6α,16α-dimethyl-4-pregnene-17α,21-diol-3,11,20-trione 21-acetate, in 6 ml. t-butanol, and 0.01 ml. of glacial acetic acid is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated using partition chromatography on diatomaceous silica (supercel) to give 6α,16α-dimethyl-1,4-pregnadiene-17α,21-diol-3,11,20-trione 21-acetate.

*Example 2*

To a solution of 100 mg. of 17α,20,20,21-bismethylenedioxy-6α,16α-dimethyl-4-pregnene-3,11-dione, prepared as described in Example 1 hereinabove, in 6 ml. t-butanol, and 0.01 ml. of glacial acetic acid is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated using partition chromatography on diatomaceous silica (supercel) to give 17α,20,20,21-bismethylenedioxy - 6α,16α - dimethyl - 1,4 - pregnadiene-3,11-dione.

About 0.1 gram of 17α,20,20,21-bismethylenedioxy-6α,16α-dimethyl-1,4-pregnadiene-3,11-dione is suspended in 18 cc. of 30% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give 6α,16α-dimethyl-1,4-pregnadiene-17α,21-diol-3,11,20-trione. This material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0–5° C. and poured into ice water. The aqueous suspension is extracted with chloroform, and the chloroform extract is washed with aqueous sodium bicarbonate solution, dried over anhydrous sodium sulfate, and evaporated to dryness in vacuo. The residual material, dissolved in 30 cc. benzene, is adsorbed on 5 grams of acid-washed alumina; the adsorbate is washed with 50 cc. ether. The adsorbate is then eluted with 250 cc. of a 5:5 mixture of ether-chloroform, and then with 50 cc. of a 3:7 mixture of ether-chloroform. The eluates are evaporated in vacuo, and the residual material is crystallized from methanol to give 6α,16α-dimethyl-1,4-pregnadiene-17α,21-diol-3,11,20-trione 21-acetate.

*Example 3*

About 5 grams of 3-ethylenedioxy-17α,20,20,21-bismethylenedioxy - 6,16α - dimethyl - 5 - pregnene - 11 - one, which can be prepared as described in Example 1 hereinabove, is dissolved in about 85 cc. of benzene. This solution is added to a stirred suspension containing 5 grams of lithium aluminum hydride in one liter of anhydrous ether, and the resulting suspension is heated under reflux for a period of about 4 hours. The reaction mixture is allowed to cool to about room temperature, and approximately 33 cc. of ethyl acetate is added to destroy excess lithium aluminum hydride. The resulting mixture is admixed with about 100 cc. of water, the ethereal layer is decanted, and the aqueous layer, diluted with an additional 200 cc. of water, is extracted with chloroform. The ether and chloroform layers are combined, and the combined organic layers are dried over anhydrous sodium sulfate and evaporated to dryness in vacuo. The residual material, dissolved in about 250 cc. of benzene, is adsorbed on about 150 grams of acid-washed alumina, and the resulting adsorbate is eluted utilizing mixtures of petroleum ether-ether. This eluate is evaporated in vacuo, and the residual material is purified by crystallization from ether to give 3-ethylenedioxy-17α,20,20,21 - bismethylenedioxy - 6,16α - dimethyl - 5-pregnene-11β-ol.

A solution containing about 5 grams of 3-ethylenedioxy - 17α,20,20,21 - bismethylenedioxy - 6,16α - dimethyl-5-pregnene-11β-ol, 500 cc. of anhydrous acetone and about 0.5 g. of p-toluenesulfonic acid monohydrate is allowed to stand for a period of about 15 hours. The reaction solution is poured into water, and the aqueous mixture is extracted with chloroform. The chloroform solution is washed with aqueous sodium bicarbonate solution, dried over anhydrous sodium sulfate, and the chloroform solution is evaporated to dryness in vacuo. The residual material is crystallized from benzene to give 17α,20,20,21 - bismethylenedioxy - 6α,16α - dimethyl - 4-pregnene-11β-ol-3-one.

About 0.1 gram of 17α,20,20,21-bismethylenedioxy-6α,16α-dimethyl-4-pregnene-11β-ol-3-one is suspended in 18 cc. of 50% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give 6α,16α-dimethyl-4-pregnene-11β,17α,21-triol-3,20-dione. This material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0–5° C. and poured into ice water. The aqueous suspension is extracted with chloroform, and the chloroform extract is washed with aqueous sodium bicarbonate solution, dried over anhydrous sodium sulfate, and evaporated to dryness in vacuo. The residual material, dissolved in 30 cc. benzene, is adsorbed on 5 grams of acid-washed alumina; the adsorbate is washed with 50 cc. ether. The adsorbate is then eluted with 250 cc. of a 5:5 mixture of ether-chloroform, and then with 50 cc. of a 3:7 mixture of ether-chloroform. The eluates are evaporated in vacuo, and the residual material is crystallized from methanol to give 6α,16α-dimethyl-4-pregnene-11β,17α,21-triol-3,20-dione 21-acetate.

To a solution of 100 mg. of 6α,16α-dimethyl-4-pregnene-11β,17α,21-triol-3,20-dione 21-acetate, in 6 ml. t-butanol, and 0.01 ml. of glacial acetic acid, is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury over night then centrifuged and the clear benzene solution is evaporated in vacuo. The residual material thus obtained is separated using partition chromatography on diatomaceous silica (supercel) to give 6α,16α-dimethyl-1,4-pregnadiene-11β,17α,21-triol-3,20-dione 21-acetate.

*Example 4*

To a solution of 100 mg. of 17α,20,20,21-bismethylenedioxy-6α,16α-dimethyl-4-pregnene-11β-ol-3-one, prepared as described in Example 1 hereinabove, in 6 ml. t-butanol, and 0.01 ml. of glacial acetic acid is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight then centrifuged and the clear benzene solution is evaporated in vacuo. The residual material thus obtained is separated using partition chromatography on diatomaceous silica (supercel) to give 17α,20,20,21-bismethylenedioxy-6α,16α-dimethyl-1,4-pregnadiene-11β-ol-3-one.

About 0.1 gram of 17α,20,20,21-bismethylenedioxy-6α,16α-dimethyl-1,4-pregnadiene-11β-ol-3-one is suspended in 18 cc. of 50% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give 6α,16α-dimethyl-1,4-pregnadiene-11β,17α,21-triol-3,20-dione. This material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0–5° C. and poured into ice water. The aqueous suspension is extracted with chloroform, and the chloroform extract is washed with aqueous sodium bicarbonate solution, dried over anhydrous sodium sulfate, and evaporated to dryness in vacuo. The residual material, dissolved in 30 cc. benzene, is adsorbed on 5 grams of acid-washed alumina; the adsorbate is washed with 50 cc. ether. The adsorbate is then eluted with 250 cc. of a 5:5 mixture of ether-chloroform, and then with 50 cc. of a 3:7 mixture of ether-chloroform. The eluates are evaporated in vacuo, and the residual material is crystallized from methanol to give 6α,16α-dimethyl-1,4-pregnadiene-11β,17α,21-triol-3,20-dione 21-acetate.

*Example 5*

To a cooled solution of 436 mg. of 6α,16α-dimethyl-4-pregnene-11β,17α,21-triol-3,20-dione 21-acetate (which can be prepared as described in Example 3 hereinabove) in 2.5 cc. dimethyl formamide and 2.0 ml. of dry pyridine is added 1.0 ml. of methane sulfonyl chloride, while maintaining the temperature below 0° C. The resulting mixture is allowed to warm to room temperature, at which point a precipitate appears; the resulting mixture is then heated to a temperature of about 70–100° C. for a period of about 10 minutes. About 15 ml. of water is added slowly to the reaction mixture, with stirring, and the aqueous mixture is extracted with ethyl acetate. The combined ethyl acetate extracts are washed with water, then with dilute aqueous hydrochloric acid solution, again with water, and then with a dilute aqueous sodium bicarbonate solution. The washed ethyl acetate solution is dried, and the solvent is evaporated in vacuo; the residual material is triturated with ether, and the crystalline material is recrystallized to give 6α,16α-dimethyl-4,9(11)-pregnadiene-17α,21-diol-3,20-dione 21-acetate. A suspension of 330 mg. of 6α,16α-dimethyl-4,9(11)-pregnadiene-17α,21-diol-3,20-dione 21-acetate and 1.8 g. of N-bromo-succinimide in a mixture of 50 ml. of dioxane and 10 ml. of water is cooled to 10° C. Then with stirring, 10 ml. of cold 1.0 N aqueous perchloric acid is added. The temperature of the reaction mixture is allowed to rise to 15° C. and is maintained at this point for about two and one-half hours during which time the solid material slowly dissolves. The resulting yellow solution is treated with 1.0 ml. of allyl alcohol to discharge the color and the remaining N-bromo-succinimide, and the resulting solution is evaporated to a small volume in vacuo. The concentrated solution is diluted with water, and the aqueous mixture is extracted with ethyl acetate. The ethyl acetate extracts are washed, dried and evaporated to dryness, and the residual material is crystallized from ethyl acetate-ether to give 9α-bromo-6α,16α-dimethyl-4-pregnene-11β,17α,21-triol-3,20-dione 21-acetate.

A solution of 210 mg. of 9α-bromo-6α,16α-dimethyl-4-pregnene-11β,17α,21-triol-3,20-dione 21-acetate and 240 mg. of potassium acetate in 10 ml. of absolute ethanol is heated under reflux for two hours. The reaction mixture is cooled to room temperature, evaporated in vacuo to a small volume, and diluted with water. The concentrated aqueous mixture is extracted with three portions of ethyl acetate, and the combined ethyl acetate extracts are washed with water, dried, and evaporated to dryness in vacuo. The residual material is crystallized from ethyl acetate-ether to give 6α,16α-dimethyl-9,11-epoxy-4-pregnene-17α,21-diol-3,20-dione 21-acetate.

To a solution of 83 mg. of anhydrous hydrogen fluoride in 4.7 ml. of ice-cold alcohol-free chloroform is added an ice-cold solution of 416 mg. of 6α,16α-dimethyl-9,11-epoxy-4-pregnene-17α,21-diol-3,20-dione 21-acetate. The solution is mixed thoroughly and maintained at 0° C. for two hours, at the end of which time 13.0 ml. of ice-cold 20% aqueous sodium acetate is added, and the resulting mixture agitated vigorously. The layers are separated, and the chloroform layer is washed with water until free of acid, dried, and the chloroform evaporated in vacuo. The residual material is crystallized from acetone-petroleum ether to give 6α,16α-dimethyl-9α-fluoro-4-pregnene-11β,17α,21-triol-3,20-dione 21-acetate. Fifty milligrams of 6α,16α-dimethyl-9α-fluoro-4-pregnene-11β,17α,21-triol-3,20-dione 21-acetate is dissolved in a mixture of 1.0 cc. of benzene and 1.0 cc. of 1 N methanolic potassium hydroxide, and the solution is allowed to stand at room temperature for a period of about 10 minutes. The solution is then acidified with acetic acid, the benzene is evaporated in vacuo, and the residual material is purified by crystallization to give 6α,16α-dimethyl-9α-fluoro-4-pregnene-11β,17α,21-triol-3,20-dione.

To a solution of 100 mg. of 16α,16α-dimethyl-9α-fluoro-4-pregnene-11β,17α,21-triol-3,20-dione 21-acetate, in 6 ml. t-butanol, and 0.01 ml. of glacial acetic acid is added 70 mg. of selenium dioxide. The mixture is heated under reflux in a nitrogen atmosphere for a period of about 60 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated, using partition chromatography on diatomaceous silica (supercel), to give 6α,16α-dimethyl-9α-fluoro-1,4-pregnadiene-11β,17α,21-triol-3,20-dione 21-acetate. This material is hydrolyzed using 1 N methanolic potassium hydroxide in benzene as described above for the hydrolysis of 6α,16α-dimethyl-9α-fluoro-4-pregnene-11β,17α,21-triol-3,20-dione 21-acetate to give 6α,16α-dimethyl 9α-fluoro-1,4-pregnadiene-11β,17α,21-triol-3,20-dione.

*Example 6*

A solution of 400 mg. of 6α,16α-dimethyl-9α-fluoro-4-pregnene-11β,17α,21-triol-3,20-dione 21-acetate in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization to give 6α,16α-dimethyl-9α-fluoro-4-pregnene-17α,21-diol-3,11,20-trione 21 - acetate. Fifty milligrams of 6α,16α-dimethyl-9α-fluoro-4-pregnene-17α,21-diol-3,11,20-trione 21-acetate is dissolved in a mixture of 1.0 cc. of benzene and 1.0 cc. of 1 N methanolic potassium hydroxide, and the solution is allowed to stand at room temperature for a period of about 10 minutes. The solution is then acidified with acetic acid, the benzene is evaporated in vacuo, and the residual material is purified by crystallization to give 6α,16α-dimethyl-9α-fluoro-4-pregnene-17α,21-diol-3,11,20-trione.

To a solution of 100 mg. of 6α,16α-dimethyl-9α-fluoro-4-pregnene-17α,21-diol-3,20-trione 21-acetate, in 6 ml. t-butanol, and 0.01 ml. of glacial acetic acid is added 70 mg. of selenium dioxide. The mixture is heated under reflux in a nitrogen atmosphere for a period of about 60 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated using partition chromatography on diatomaceous silica (supercel) to give 6α,16α-dimethyl-9α-fluoro-1,4-pregnadiene-17α,21-diol-3,11,20-trione 21-acetate. This material is hydrolyzed using 1 N methanolic potassium hydroxide in benzene as described above for the hydrolysis of 6α,16α-dimethyl-9α-fluoro-4-pregnene-17α,2-diol-3,11,20-trione 21-acetate to give 6α,16α-dimethyl-9α-fluoro-1,4-pregnadiene-17α,21-diol-3,11,20-trione.

*Example 7*

Fifty milliliters of a nutrient medium are prepared having the following composition:

| | | |
|---|---|---|
| Cerelose | g | 1 |
| Edamin | g | 1 |
| Cornsteep liquor | ml | 0.25 |
| Distilled water to make 50 ml. | | |

This medium is adjusted to pH 6.5 with KOH, sterilized and inoculated with about 2.5 to 5 ml. of a culture of *Bacillus sphaericus* (ATCC–245) microorganisms, and the inoculated culture is then incubated at a temperature of 28° C., with agitation, for a 24-hour period. To the resulting culture is added a solution containing 10 mg. of 6α,16α-dimethyl-4-pregnene-17α,21-diol-3,11,20-trione dissolved in 0.2 ml. of dimethylformamide. The culture containing the steroid compound is incubated, with agitation, for an additional period of about 24 hours at 28° C.

The fermentation broth is extracted with four 50 ml. portions of ethyl acetate, and the ethyl acetate extracts are combined and evaporated in vacuo to a volume of about 5 ml. The concentrated solution is then streaked on paper chromatograms which are developed using formamide as the stationary phase and 50% benzene-50% chloroform as the mobile phase. After 8 hours development in a descending system, the upper bands for each chromatogram, corresponding to the Δ¹-dehydro derivative, are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized to give 6α,16α-dimethyl-1,4-pregnadiene-17α,21-diol-3,11,20-trione.

The 6α,16α - dimethyl - 1,4-pregnadiene-17α,21-diol-3,11,20-trione is treated with acetic anhydride and pyridine to give the 21-acetyl derivative, which is purified by recrystallization to give substantially pure 6α,16α-dimethyl - 1,4-pregnadiene-17α,21-diol-3,11,20-trione 21-acetate.

*Example 8*

Fifty milliliters of a nutrient medium are prepared having the following composition:

| | | |
|---|---|---|
| Cerelose | g | 1 |
| Edamin | g | 1 |
| Cornsteep liquor | ml | 0.25 |
| Distilled water to make 50 ml. | | |

This medium is adjusted to pH 6.5 with KOH, sterilized and inoculated with about 2.5 to 5 ml. of a culture of *Nocardia asteroides* (ATCC 9970) microorganisms, and the inoculated culture is then incubated at a temperature of 28° C., with agitation, for a 24-hour period. To the resulting culture is added a solution containing 10 mg. of 6α,16α-dimethyl-4-pregnene-11β,17α,21-triol-3,20-dione dissolved in 0.2 ml. of dimethylformamide. The culture containing the steriod compound is incubated, with agitation, for an additional period of about 24 hours at 28° C.

The fermentation broth is extracted with four 50 ml.

portions of ethyl acetate, and the ethyl acetate extracts are combined and evaporated in vacuo to a volume of about 5 ml. The concentrated solution is then streaked on paper chromatograms which are developed using formamide as the stationary phase and 50% benzene-50% chloroform as the mobile phase. The upper bands for each chromatogram corresponding to the $\Delta^1$-dehydro derivative are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized to give 6α,16α-dimethyl-1,4-pregnadiene-11β,17α,21-triol-3,20-dione.

The 6α,16α-dimethyl-1,4-pregnadiene-11β,17α,21-triol-3,20-dione is treated with acetic anhydride and pyridine, and the acetylated product recrystallized to give substantially pure 6α,16α-dimethyl-1,4-pregnadiene-11β,17α,21-triol-3,20-dione 21-acetate.

Example 9

Fifty milliliteres of a nutrient medium are prepared having the following composition:

| | |
|---|---|
| Cerelose | g 1 |
| Edamin | g 1 |
| Cornsteep liquor | ml 0.25 |

Distilled water to make 50 ml.

This medium is adjusted to pH 6.5 with KOH, sterilized and inoculated with about 2.5 to 5 ml. of a culture of *Mycobacterium smegmatis* (NRRL B-1667) micro organisms, and the inoculated culture is then incubated at a temperature of 28° C., with agitation, for a 24-hour period. To the resulting culture is added a solution containing 10 mg. of 6α,16α-dimethyl-9α-fluoro-4-pregnene-11β,17α,21-triol-3,20-dione dissolved in 0.2 ml. of dimethylformamide. The culture containing the steroid compound is incubated, with agitation, for an additional period of about 24 hours at 28° C.

The fermentation broth is extracted with three 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and 50% benzene-50% chloroform as the mobile liquid phase. Two bands are secured, one of which corresponds to the more mobile component, the 6α,16α-dimethyl-9α-fluoro-4-pregnene-11β,17α,21-triol-3,20-dione starting material, and the other corresponds to the less mobile component, the $\Delta^1$-dehydro derivative. The paper chromatogram is dried, and the latter band is cut off and extracted with methanol. The material extracted with methanol is again subjected to streak-paper chromatography, using paper which has been extracted for 48 hours with methanol, and employing the chloroform-formamide system previously employed. The resulting chromatogram shows only a trace band corresponding to the starting material with the major band that corresponding to the less mobile component, the $\Delta^1$-dehydro derivative. The paper chromatogram is thoroughly dried, and the band corresponding to the less mobile component is cut off and extracted with methanol. The methanol extract is evaporated to dryness in vacuo to give 6α,16α-dimethyl-9α-fluoro-1,4-pregnadiene-11β,17α,21-triol-3,20-dione.

The 6α,16α-dimethyl-9α-fluoro-1,4-pregnadiene-11β,17α,21-triol-3,20-dione is reacted with excess acetic anhydride in pyridine to give the 21-acetyl derivative which is purified by recrystallization from benzene-petroleum ether to give substantially pure 6α,16α-dimethyl-9α-fluoro-1,4-pregnadiene-11β,17α,21-triol-3,20-dione 21-acetate.

Example 10

The fermentation procedures of Examples 7, 8 and 9 are repeated but using, in place of the microorganisms and the 6α,16α-dimethyl-11-oxygenated-4-pregnene-17α,21-diol-3,20-dione starting material employed in those examples, the microorganism strains and steroid starting compounds indicated in the table hereinbelow. The resulting fermentation broths are treated in accordance with the isolation methods described in Examples 7, 8 and 9 to give, for the particular microorganism strain and steroid substrate used, the 6α,16α-dimethyl-11-oxygenated-1,4-pregnadiene-17α,21-diol-3,20-dione indicated in the following table:

| Expt. No. | Substrate | Microorganism | 6α,16α-Dimethyl-11-oxygenated-1,4-Pregnadiene-17α, 21-Diol-3,20-Dione Product |
|---|---|---|---|
| 1 | 6α,16α-Dimethyl-9α-fluoro-4-pregnene-17α,21-diol-3,11,20-trione 21-acetate. | *Bacillus sphaericus* ATCC-7055. | 6α,16α-Dimethyl-9α-fluoro-1,4-pregnadiene-17α, 21-diol-3,11,20-trione. |
| 2 | 6α,16α-Dimethyl-9α-fluoro-4-pregnene-11β,17α, 21-triol-3,20-dione 21-acetate. | *Bacillus sphaericus* ATTC-7063. | 6α,16α-Dimethyl-9α-flucro-1,4-pregnadiene-11β, 17α,21-triol-3,20-dione. |
| 3 | 6α,16α-Dimethyl-9α-fluoro-4-pregnene-17α,21-diol-3,11,20-trione. | *Nocardia leishmanii* ATCC-6855. | 6α,16α-Dimethyl-9α-fluoro-1,4-pregnadiene-17α, 21-diol-3,11,20-trione. |
| 4 | 6α,16α-Dimethyl-9α-fluoro-4-pregnene-11β,17α, 21-triol-3,20-dione. | *Nocardia formica* NRRL-2470 | 6α,16α-Dimethyl-9α-fluoro-1,4-pregnadiene-11β, 17α 21-triol-3,20-dione. |
| 5 | 6α,16α-Dimethyl-4-pregnene-11β,17α,21-triol-3, 20-dione. | *Mycobacterium phlei* ATCC-12,298. | 6α,16α-Dimethyl-1,4-pregnadiene-11β,17α,21-triol-3,20-dione. |
| 6 | 6α,16α-Dimethyl-4-pregnene-17α,21-diol-3,11,20-trione. | *Mycobacterium lacticola* ATCC-12,297. | 6α,16α-Dimethyl-1,4-pregnadiene-17α,21-diol-3,11, 20-trione. |

The 16-methyl-4-pregnene-17α,21-diol-3,11,20-trione compound used as starting material in the foregoing examples is prepared, starting with the known 16-pregnene-3α-ol-11,20-dione 3-acetate, in accordance with the following procedure:

A solution of 10.22 g. of methyl iodide in 50 ml. of ether is added to 1.73 g. of magnesium in 50 ml. of ether. To the resulting ethereal solution of methyl magnesium iodide, maintained under a nitrogen atmosphere, is added 0.045 g. of anhydrous cuprous chloride. To this mixture is added, over a period of about one hour, during which period the reaction mixture is stirred vigorously and maintained at approximately room temperature, a solution of about 5.6 g. of 16-pregnene-3α-ol-11, 20-dione 3-acetate in 175 ml. of ether. A white granular solid separates during this addition. The resulting mixture is heated under gentle reflux for two hours after which the reaction mixture is cooled, and 125 ml. of saturated, aqueous ammonium chloride solution is added followed by 200 ml. of ether. The layers are separated, and the ethereal layer is washed with three 50 ml. portions of water. The washed ethereal layer is dried, and the solvent evaporated in vacuo to give a brown viscous oil. The latter material is heated for 15 minutes at 60–70° C. with a mixture of 25 ml. acetic anhydride and 25 ml. pyridine and the acetylated product is purified by chromatography on acid-washed alumina followed by crystallization from petroleum ether to give approximately 1.5 g. of substantially pure 16α-methyl-pregnene-3α-ol-11,20-dione 3-acetate.

To a solution of 0.8 g. of 16α-methyl-pregnane-3α-ol-11,20-dione 3-acetate in 40 ml. of methanol is added 1.5 ml. of concentrated aqueous hydrochloric acid and the resulting solution is stirred overnight at about 25° C. The reaction solution is evaporated in vacuo at 25° C. to a small volume, and the concentrated solution is poured into 50 ml. of ice water. The white solid which precipitates is recovered by filtration, washed with water and recrystallized from ethyl acetate to give 16α-methyl-pregnane-3α-ol-11,20-dione.

A solution of 22 g. of 16α-methyl-pregnane-3α-ol-11,20-dione 21-acetate and 1 g. of p-toluene-sulfonic acid in 250 ml. of acetic anhydride is heated at reflux under nitrogen for a period of approximately 3 days. Two grams of potassium acetate (anhydrous) is added, and the volatile solvents are separated by distillation in vacuo. The residual material is extracted with benzene, and the benzene extract is filtered to remove insoluble material. The benzene extracts are evaporated to a volume of 100 ml. and petroleum ether is added to the cloud point. The resulting solution is adsorbed on 600 g. of acid-washed alumina; the alumina adsorbate is then washed with 2 liters of petroleum ether. The adsorbate is then eluted with 85:15 petroleum-ether-ether mixture, and the first four liters of eluate is collected, and evaporated to dryness in vacuo to give a mixture of enol acetate containing 16α-methyl-17(20)-pregnene-3α,20-diol-11-one 3,20-diacetate. This mixture of enolates, weighing approximately 14 g., is dissolved in 50 ml. of benzene, an excess of perbenzoic acid is added, and the mixture is kept at about 25° C. for 16 hours. The reaction mixture is shaken with dilute aqueous potassium hydroxide solution until the benzene layer is free of perbenzoic acid; the benzene layer is then washed with water until neutral, dried, and the solvent evaporated in vacuo to give a crystalline material, 16α-methyl-17α,20-epoxy-pregnane-3α,30-diol-11-one 3,20-diacetate. The latter material is dissolved, without purification, in 200 ml. of methanol, 120 ml. of water and 10 g. of potassium bicarbonate, and the resulting solution is heated at reflux under nitrogen for a period of 16 hours. The methanol is evaporated from the hydrolysis solution in vacuo, and the residual oil is extracted from the resulting aqueous solution with chloroform. The chloroform extract is washed with water to neutrality, dried, and the chloroform is evaporated under reduced pressure. The residual oil is triturated with ether, and the crystalline material thus formed is recrystallized from ethyl acetate-petroleum ether to give 16α-methyl-pregnane-3α,17α-diol-11,20 dione.

To a solution of 7.0 g. of 16α-methyl-pregnane-3α,17α-diol-11,20-dione in 50 ml. of chloroform is added dropwise with stirring a solution containing 3.36 g. of bromine in 24.2 ml. of chloroform over a period of about 60 minutes. The reaction mixture is dissolved in 200 ml. of ethyl acetate, and the resulting solution washed with water until neutral, dried, and the solvents evaporated therefrom in vacuo. The residual crude material is dissolved in a minimum quantity of ethyl acetate, the resulting solution is diluted with ether, and the mixture is stirred until crystals form. The crystalline product is recovered by filtration and washed, by slurrying, with 50:50 ether-petroleum ether mixture to give about 5 g. of 21-bromo-16α-methyl-pregnane-3α,17α-diol-11,20-dione.

This 5 g. of 21-bromo-16α-methyl-pregnane-3α,17α-diol-11,20-dione is mixed with 5.0 g. of anhydrous potassium acetate, 4.0 g. of sodium iodide and 0.03 ml. of glacial acetic acid, and 100 ml. of acetone is added to the resulting mixture. This mixture is then heated at reflux, with stirring, for a period of about 16 hours, and the reaction mixture is cooled, filtered, and the insoluble material is washed with acetone. The filtered solution is evaporated in vacuo thereby removing the solvents, and the residual material is slurried with water, and the aqueous mixture extracted with ethyl acetate. The ethyl acetate extract is washed with water to neutrality, dried, and the solvent is evaporated in vacuo to give an oil. This oil is crystallized from ether, and recrystallized from ethyl acetate-ether to give 16α-methyl-pregnane-3α,17α,21-triol-11,20-dione 21-acetate.

A solution of 400 mg. of 16α-methyl-pregnane-3α-17α,21-triol-11,20-dione 21-acetate in 4 ml. of pyridine is added to the complex formed by the addition of 400 mg. of chromium trioxide to 4 ml. of pyridine. The mixture is swirled until thoroughly mixed, and then allowed to stand at room temperature overnight. The reaction mixture is poured into water, and the aqueous mixture is extracted with ether, and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by the crystallization from ethyl acetate to give 16α-methyl-pregnane-17α,21-diol-3,11,20-trione 21-acetate.

To 100 mg. of 16α-methyl-pregnane-17α,21-diol-3,11,20-trione 21-acetate dissolved in 2 ml. of chloroform and 2.25 ml. of glacial acetic acid, at a temperature of −55° C., is added two drops of a 0.001 N solution of dry HBr in glacial acetic acid. To about 0.38 ml. of 0.001 N HBr in glacial acetic acid, at −55° C., is added 0.43 ml. of a solution containing 40 mg. of bromine in chloroform, and the resulting solution is added, over about a 10-minute period, to the solution of the steroid, while maintaining the reaction mixture at about −55° C. The reaction mixture is allowed to stand at −55° C. for about one-half hour; a solution containing 250 mg. of sodium acetate in 3 ml. of water is added, and the resulting mixture is stirred for about 5 minutes. Five milliliters of water are then added, and the aqueous mixture is extracted with ethyl acetate. The ethyl acetate extract is washed with aqueous sodium bicarbonate solution to neutrality, then with water, dried, and the solvent is evaporated in vacuo. The residual material is dissolved in 2 ml. of acetone, and to the solution is added 25 mg. of sodium bromide and 1 ml. of water. The resulting mixture is heated under reflux for a period of about 5 hours, the reaction mixture is cooled, and the acetone is evaporated in vacuo. The residual material is extracted into ether, the ether extract is washed with water, dried, and the solvent is evaporated to a volume of about 1 ml.; petroleum ether is added to this solution, and the crystalline material which separates is recovered and dried to give approximately 90 mg. of 4-bromo-16α-methyl-pregnane-17α,21-diol-3,11,20-trione 21-acetate.

A mixture of 33 mg. of semicarbazide, 90 mg. of 4-bromo-16α-methyl-pregnane-17α,21-diol-3,11,20-trione 21-acetate, 90 mg. of anhydrous sodium sulfate, 0.3 ml. of dimethyl formamide and 3.5 ml. of chloroform is heated under reflux in contact with a nitrogen atmosphere for a period of about 45 minutes. Three milliliters of water are added to the reaction mixture and the resulting mixture is heated under reflux for about 10 minutes. The mixture is cooled, extracted with ethyl acetate and the washed and dried ethyl acetate extract evaporated to dryness in vacuo. The residual material is crystallized from methanol and recrystallized from ethyl acetate to give 16α-methyl-4-pregnene-17α,21-diol-3,11,20-trione 3-semicarbazone 21-acetate; M.P. 225–228° C. (dec). Fifty milligrams of 16α-methyl-4-pregnene-17α,21-diol-3,11,20-trione-3-semicarbazone 21-acetate is dissolved in a mixture of 1.0 cc. of benzene and 1.0 cc. of 1.1 N methanolic potassium hydroxide, and the solution is allowed to stand at room temperature for a period of about 10 minutes. The solution is then acidified with acetic acid, the benzene is evaporated in vacuo, and the residual material is recrystallized from ethyl acetate to give 16α - methyl-4-pregnene-17α,21-diol-3,11,20-trione-3, 20-bis-semicarbazone.

A solution of 90 mg. of 16α-methyl-pregnene-17α,21-diol-3,11,20-trione-3-semicarbazone, 1.0 ml. of pyruvic acid, 1.0 ml. of glacial acetic acid and 1.0 ml. of water is allowed to stand for 20 hours at room temperature. The reaction solution is poured into 8 ml. of water and the aqueous mixture is extracted with 40 ml. of chloroform in six portions. The combined chloroform extract is washed with an aqueous solution of sodium bicarbonate, dried over sodium sulfate and evaporated in vacuo. The residual material is crystallized from acetone to give 16α-methyl-4-pregnene-17α,21-diol-3,11,20-trione.

Various changes and modifications may be made in carrying out the present invention without departing from the spirit and scope thereof. Insofar as these changes and modifications are within the purview of the annexed claims, they are to be considered as part of our invention.

We claim:
1. A compound having the following formula:

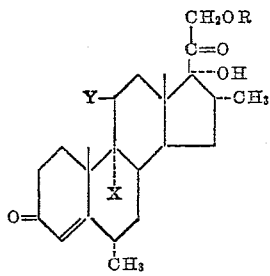

wherein Y is a substituent selected from the group consisting of keto and hydroxy, X is selected from the group consisting of hydrogen, bromo and fluoro, and R is selected from the group consisting of hydrogen, lower hydrocarbon carbonyl and phosphoryl.

2. 6α,16α - dimethyl - 4-pregnene-17α,21-diol-3-11,20-trione.
3. 6α,16α - dimethyl - 4-pregnene-17α,21-diol-3,11,20-trione 21-phosphate.
4. 6α,16α - dimethyl - 4-pregnene-17α,21-diol-3,11,20-trione 21-acetate.
5. 6α,16α - dimethyl - 4-pregnene-17α,21-diol-3,11,20-trione 21-(tertiary-butyl acetate).
6. 6α,16α - dimethyl - 4-pregnene-11β,17α,21-triol-3,20-dione.
7. 6α,16α - dimethyl - 4 - pregnene - 11β,17α,21-triol-3,20-dione 21-acetate.
8. 6α,16α - dimethyl-4-pregnene-11β,17α,21-triol-3,20-dione 21-(tertiary-butyl acetate).
9. 6α,16α - dimethyl - 4-pregnene-11β,17α,21-triol-3,20-dione 21-phosphate.
10. 6α,16α - dimethyl-9α-fluoro-4-pregnene-11β,17α,21-triol-3,20-dione.
11. 6α,16α - dimethyl - 9α-fluoro-4-pregnene-11β,17α,21-triol-3,20-dione 21-acetate.
12. 6α,16α - dimethyl - 9α - fluoro-4-pregnene-17α,21-diol-3,11,20-trione.
13. 6α,16α - dimethyl-9α-fluoro-4-pregnene-17α,21-diol-3,11,20-trione 21-acetate.
14. A compound having the following formula:

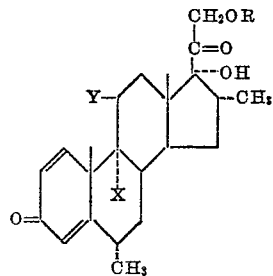

wherein Y is a substituent selected from the group consisting of keto and hydroxy, X is selected from the group consisting of hydrogen, bromo and fluoro, and R is selected from the group consisting of hydrogen, lower hydrocarbon carbonyl and phosphoryl.

15. 6α,16α - dimethyl-1,4-pregnadiene-17α,21-diol-3,11, 20-trione.
16. 6α,16α - dimethyl-1,4-pregnadiene-17α,21-diol-3,11, 20-trione 21-phosphate.
17. 6α,16α - dimethyl-1,4-pregnadiene-17α,21-diol-3,11, 20-trione 21-acetate.
18. 6α,16α - dimethyl-1,4-pregnadiene-17α,21-diol-3,11, 20-trione 21-(tertiary-butyl acetate).
19. 6α,16α - dimethyl-1,4-pregnadiene-11β,17α,21-triol-3,20-dione.
20. 6α,16α - dimethyl-1,4-pregnadiene-11β,17α,21-triol-3,20-dione 21-acetate.
21. 6α,16α - dimethyl-1,4-pregnadiene-11β,17α,21-triol-3,20-dione 21-tertiary-butyl acetate).
22. 6α,16α - dimethyl-1,4-pregnadiene-11β,17α,21-triol-3,20-dione 21-phosphate.
23. 6α,16α - dimethyl - 9α-fluoro-1,4-pregnadiene-11β, 17α,21-triol-3,20-dione.
24. 6α,16α - dimethyl - 9α-fluoro-1,4-pregnadiene-11β, 17α,21-triol-3,20-dione 21-acetate.
25. 6α,16α - dimethyl - 9α-fluoro-1,4-pregnadiene-17α, 21-diol-3,11,20-trione.
26. 6α,16α - dimethyl - 9α-fluoro-1,4-pregnadiene-17α, 21-diol-3,11,20-trione 21-acetate.

References Cited in the file of this patent
UNITED STATES PATENTS

| | | |
|---|---|---|
| 2,602,769 | Murray et al. | July 8, 1952 |
| 2,649,402 | Murray et al. | Aug. 18, 1953 |
| 2,773,060 | Levin et al. | Dec. 4, 1956 |
| 2,785,203 | Sarett | Mar. 12, 1957 |
| 2,789,117 | Sarett | Apr. 16, 1957 |
| 2,797,229 | Ralls | June 25, 1957 |
| 2,809,967 | Poos et al. | Oct. 15, 1957 |
| 2,813,108 | Hanze | Nov. 12, 1957 |
| 2,866,799 | Beyler et al. | Dec. 30, 1958 |

OTHER REFERENCES

Szpilfogel et al.: Rec. Trav. Chem., 75 (1956), pp. 475–80.
Spero et al.: 78 J.A.C.S., 6213–14 (1956).
Spero et al.: 79 J.A.C.S., 1515–16 (1957).